Figure 1:
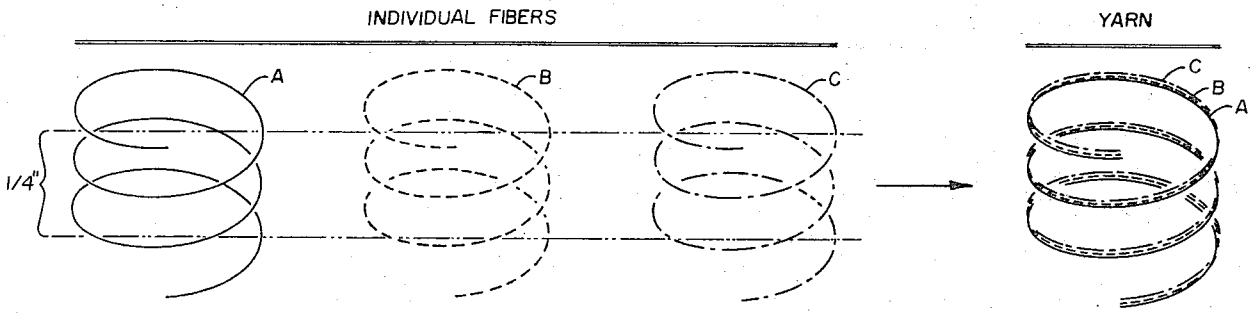
Figure 2:
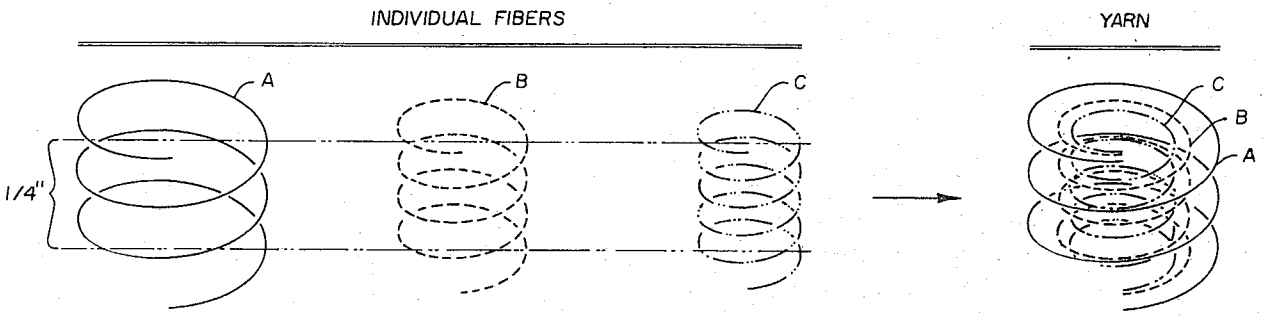
Figure 3:
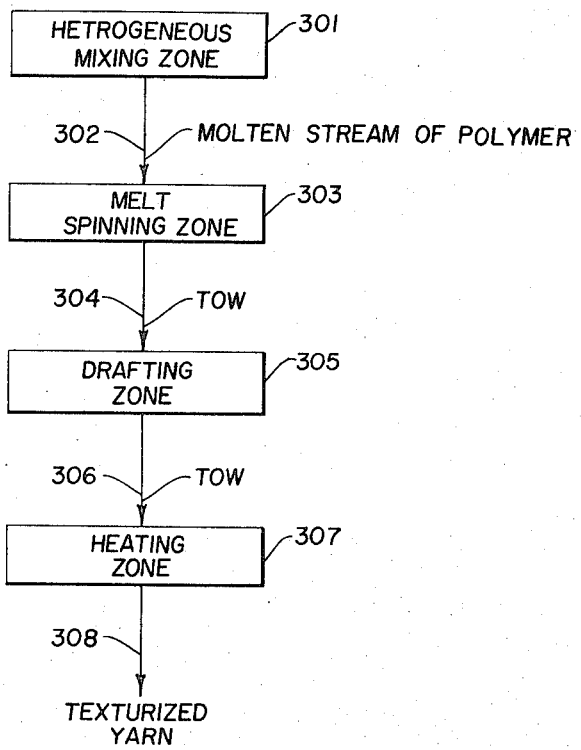
Figure 4:
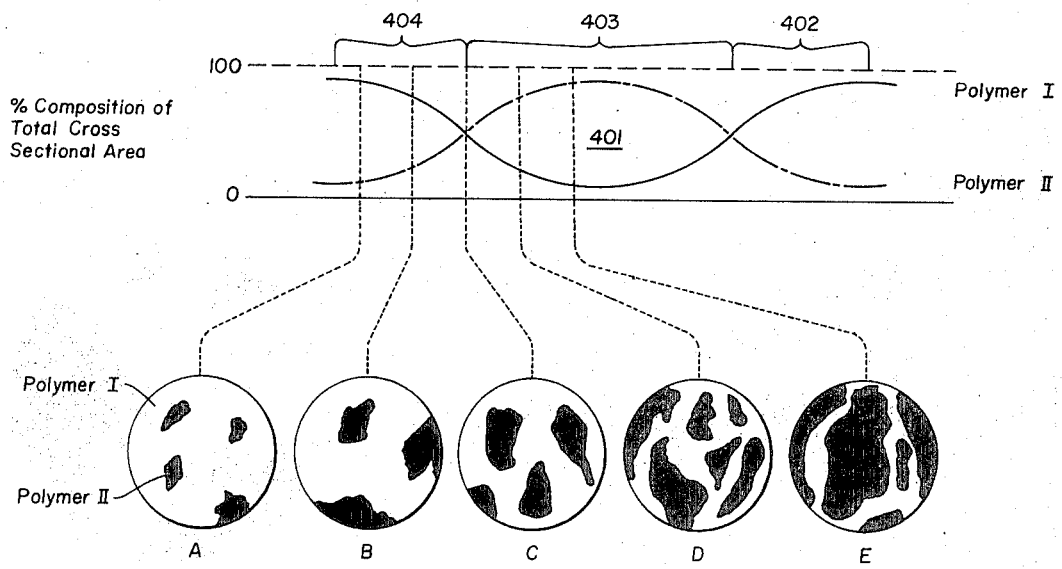
Figure 5:
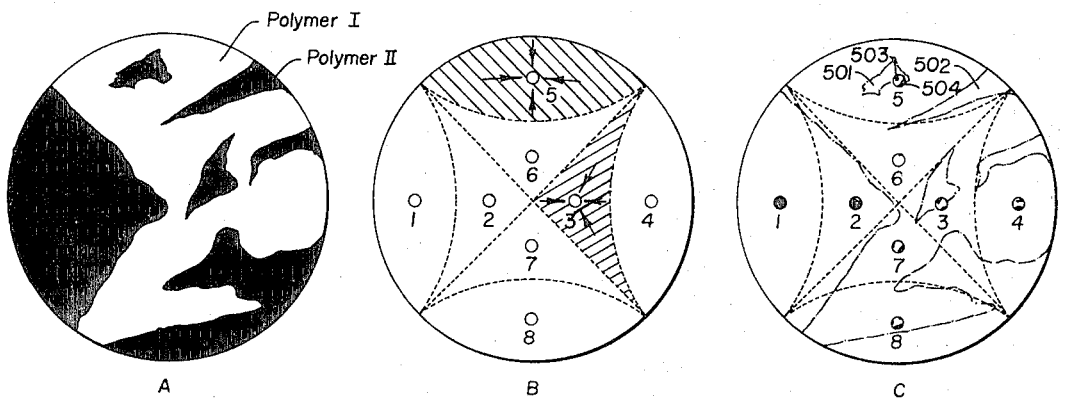
Figure 6:
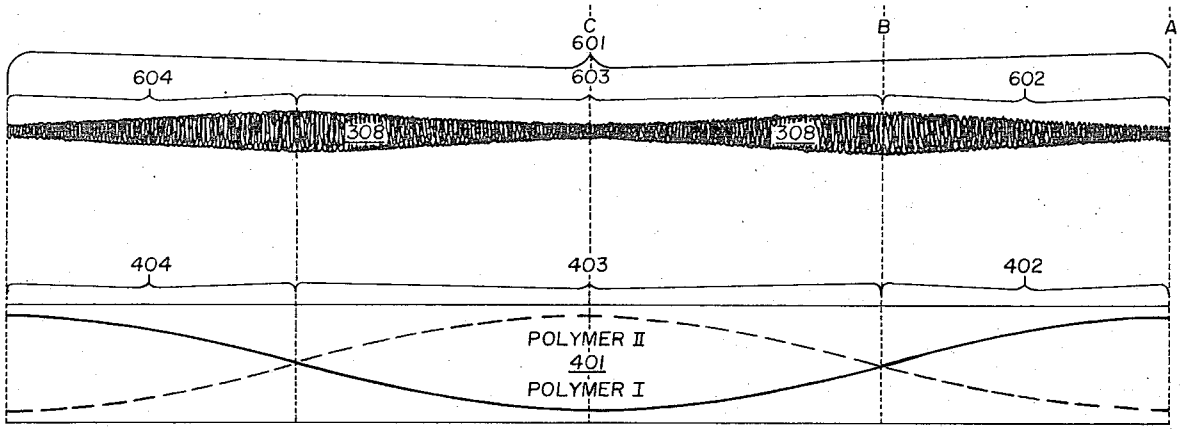
Figure 7:
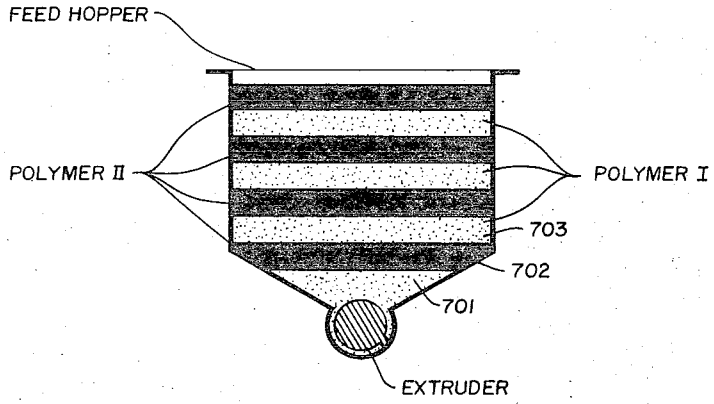
Figure 8:
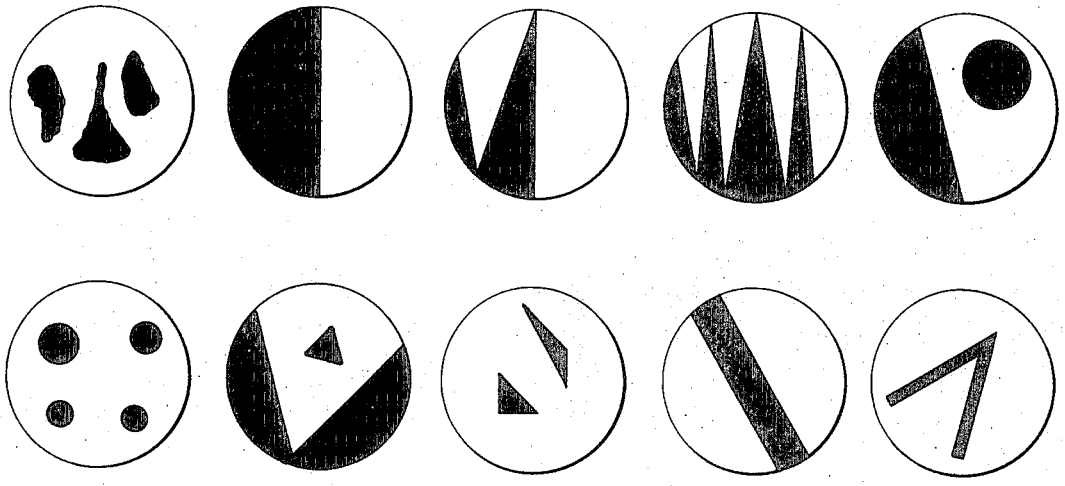
Figure 9:
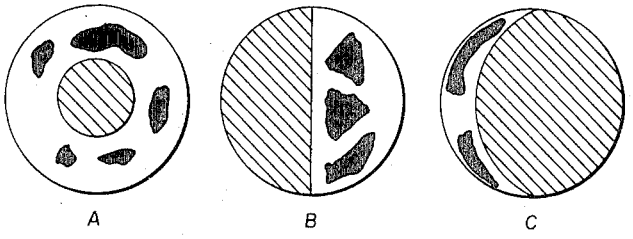
Figure 10:
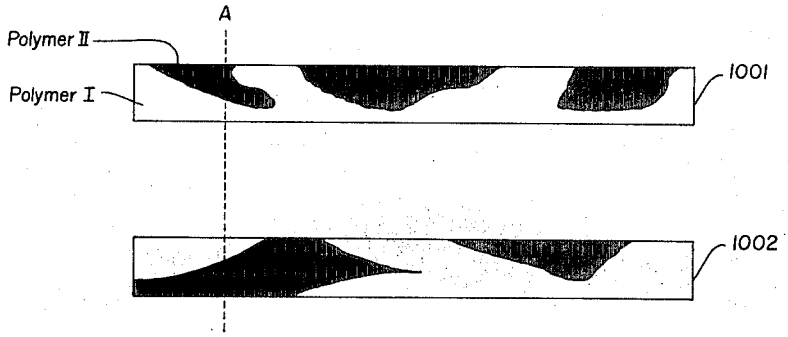
Figure 11:
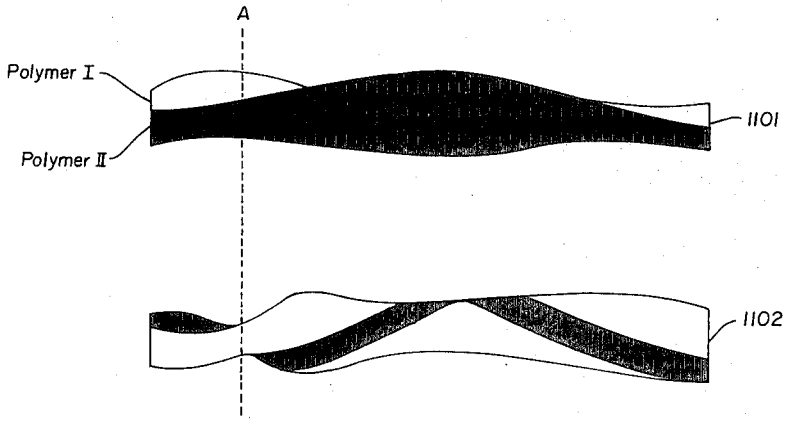

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 10, 1972

903 O.G. 374

T903,030

PROCESS FOR PRODUCING TEXTURIZED YARN

Bobby M. Phillips, 124 Bloomingdale Pike, Kingsport, Tenn. 37662

Filed June 3, 1971, Ser. No. 149,685
**Int. Cl. D02g *3/04***
U.S. Cl. 57—140 BY
6 Sheets Drawing. 40 Pages Specification

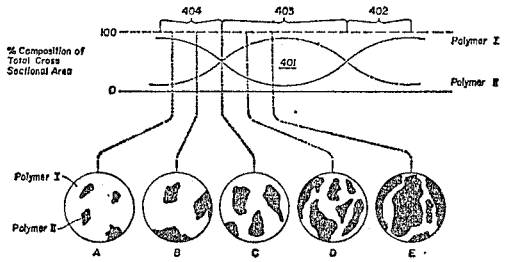

A texturized yarn is produced by the steps of forming a molten stream of polymer of a heterogeneous mixture of a first polymer and a second polymer having a shrinking characteristic different than the first polymer wherein the amounts of a first and second polymer oscillate between a major and a minor amount, melt spinning a tow from the molten stream of polymer, drafting the melt spun tow, and heating the drafted tow at self crimping conditions to produce a texturized yarn. The texturized yarn of this invention is characterized by a cross section of a plurality of helically crimped bicomponent melt spun textile fibers which have a suitable distribution of crimping characteristics at a cross section of the yarn to produce a texturized yarn and the yarn is further characterized as having an oscillating texturized character along the longitudinal axis of the yarn.

PROCESS FOR PRODUCING TEXTURIZED YARN

Filed June 3, 1971 6 Sheets-Sheet 1

BOBBY M. PHILLIPS
INVENTOR.

BY [signature]

ATTORNEY

PROCESS FOR PRODUCING TEXTURIZED YARN

Filed June 3, 1971 6 Sheets-Sheet 2

BOBBY M. PHILLIPS
INVENTOR.

BY Charles R. Martin

ATTORNEY

PROCESS FOR PRODUCING TEXTURIZED YARN

Filed June 3, 1971 6 Sheets-Sheet 3

BOBBY M. PHILLIPS
INVENTOR.

BY Charles R. Morton

ATTORNEY

PROCESS FOR PRODUCING TEXTURIZED YARN

Filed June 3, 1971 6 Sheets-Sheet 4

BOBBY M. PHILLIPS
INVENTOR.

BY Charles R. Morris

ATTORNEY

PROCESS FOR PRODUCING TEXTURIZED YARN

Filed June 3, 1971 6 Sheets-Sheet 5

BOBBY M. PHILLIPS
INVENTOR.

BY Charles R. Martin

ATTORNEY

PROCESS FOR PRODUCING TEXTURIZED YARN

Filed June 3, 1971 6 Sheets-Sheet 6

BOBBY M. PHILLIPS
INVENTOR.

BY Charles R. Wharton

ATTORNEY